United States Patent Office 3,103,849
Patented Sept. 17, 1963

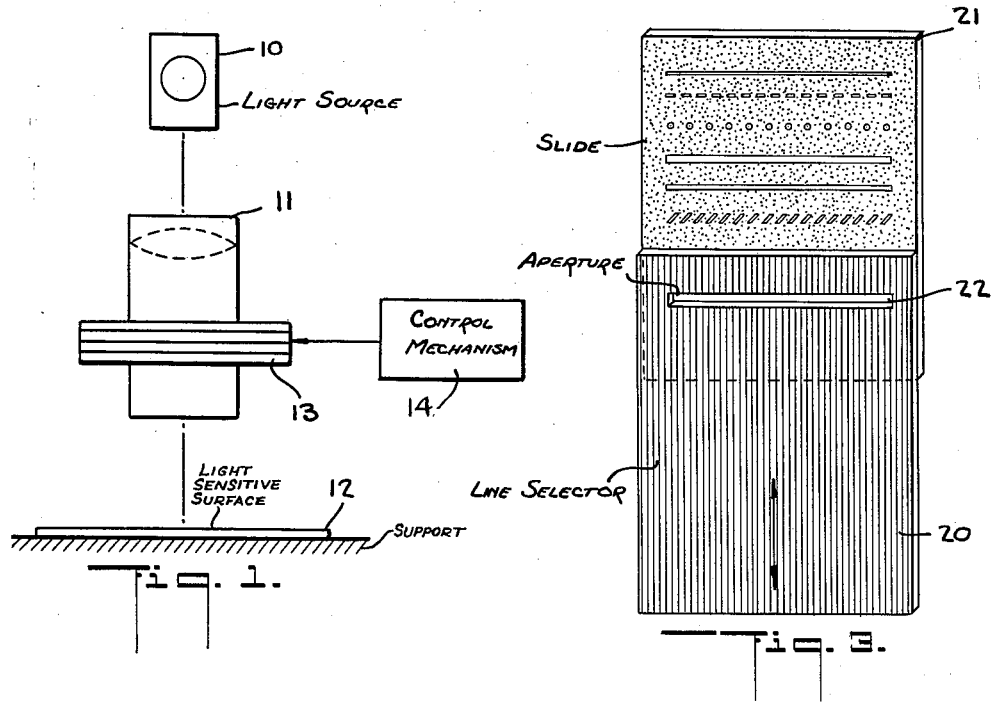
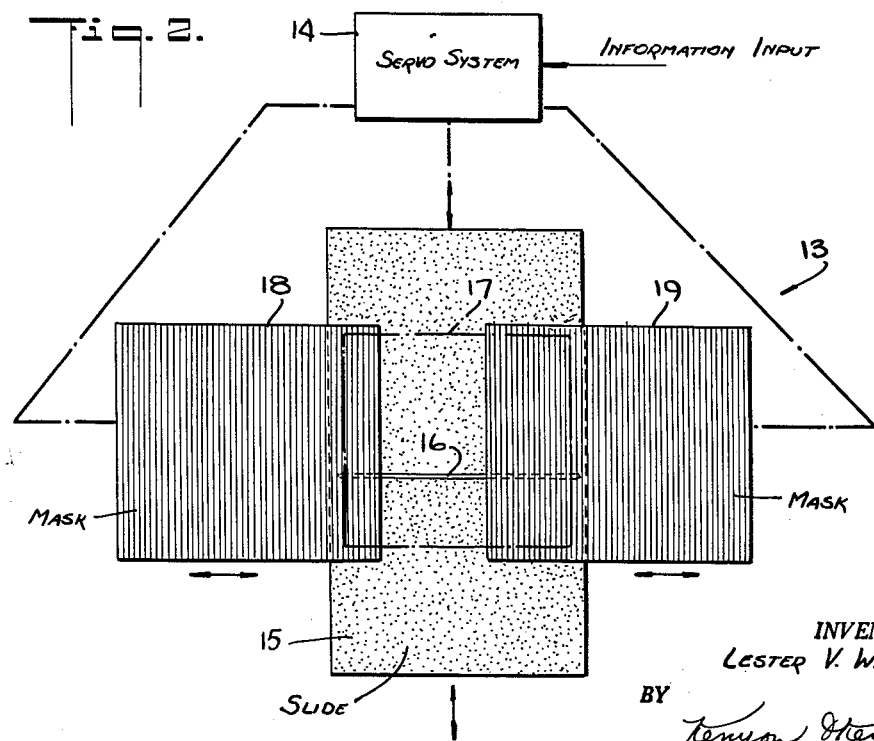

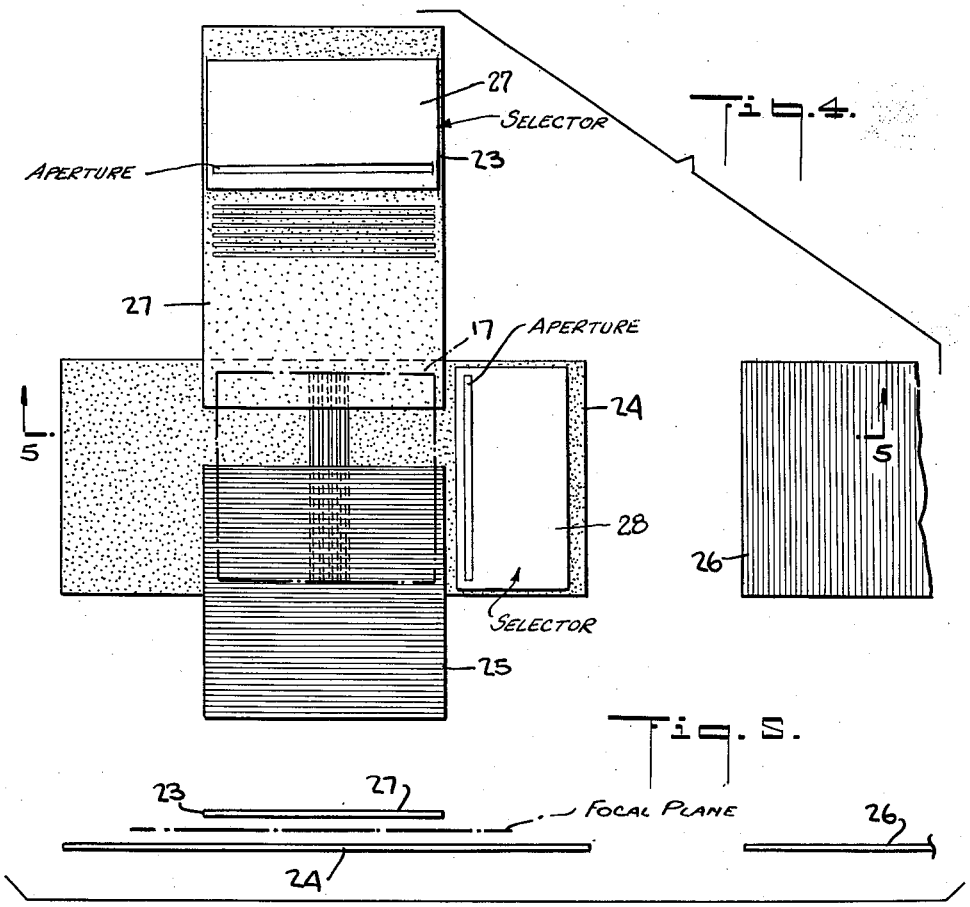
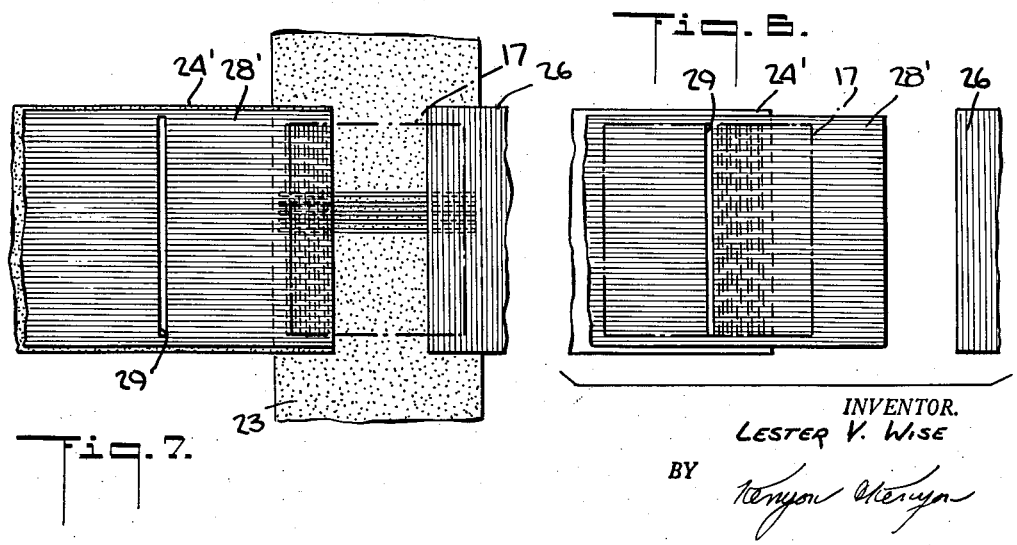

3,103,849
OPTICAL LINE INSCRIBING APPARATUS
Lester V. Wise, 37 Hollywood Drive, Plainview, N.Y.
Filed July 25, 1960, Ser. No. 44,921
8 Claims. (Cl. 88—24)

The present invention relates generally to optical line inscribing apparatus and more particularly to a photographic projector having lined slides therein selectively adapted to produce vertical and horizontal lines on a light sensitive surface.

Business forms require vertical and horizontal lines which divide the sheet into columns and rows for the entry of data. Similar requirements exist for tabulating forms, filing cards and other types of commercial records. One method heretofore employed for the making of business forms is by the use of multiple pen ruling machines wherein individual sheets are fed under a bank of pens supplied with ink to rule parallel lines along the sheet. This method is not only slow and expensive but has many other drawbacks. The ruling pens have a tendency to form ink blots, to jab into the paper and to shift position.

Another technique, which is widely used for making commercial forms, is lithography or offset printing wherein a master copy of the ruled form is photographically converted into a lithographic plate for high speed printing operations and letter-press printing from engravings, which also require a photographic negative of original art work. In order to make the master it is necessary for an artist to rule the desired lines with extreme care on a sheet. This requires a high degree of drafting skill and is a time-consuming, costly operation. Moreover, the relative cost of producing the master is particularly high for short production runs.

Accordingly, it is the principal object of the invention to provide an optical projector for inscribing accurately positioned horizontal and vertical lines on a sensitized film or paper.

More specifically it is an object of the invention to reproduce from slides horizontal and vertical lines of diverse thickness and length, the lines being either solid, dashed or dotted and being so positioned as to constitute in a composite array a ruled form such as those used in bookkeeping and in other business and data recording functions.

It is also an object of the invention to provide an optical inscribing apparatus wherein a wide choice of vertical and horizontal line combinations may readily be selected to produce a composite form on film which may serve as a master copy for lithography or other printing operations.

Briefly stated, these objects are attained in a line inscribing optical projector comprising a stable light source and a light-sensitive surface, a slide assembly being interposed between the light source and the surface and including at least one opaque slide having a light permeable slit whose position and length may be adjusted to form a desired line on the surface.

For a better understanding of the invention, as well as other objects and further features thereof, reference is made to the following detailed description to be read in conjunction with the accompanying drawing, wherein:

FIG. 1 is a schematic diagram of an optical inscriber apparatus in accordance with the invention.

FIG. 2 is a schematic diagram of one simple embodiment of a slide assembly incorporated in the inscriber apparatus.

FIG. 3 is a perspective view of a single slide and selector plate combination of the type included in the slide assembly.

FIG. 4 diagrammatically shows a composite slide assembly in plane view.

FIG. 5 is a transverse section taken along the plane indicated by line 5 in FIG. 4.

FIG. 6 is a modification of the slide assembly shown in FIG. 4.

FIG. 7 is the same modification with the selector plate shifted.

Referring now to FIG. 1, the optical projector in accordance with the invention generally comprises a controlled light source 10, a lens barrel 11, a slide assembly 13 interposed in said barrel and a light-sensitive film 12 onto which linear configurations contained in the slide assembly 13 are projected and photographed. The position of the slide within the assembly and various other control functions are carried out by a control mechanism generally represented by block 14.

Light source 10 may be any of the conventional light generators used in high quality photographic projectors which provide uniform white light of controlled duration for a predetermined exposure, the exposure period depending on known photographic factors.

As shown in FIG. 2, in its simplified form the slide assembly 13 includes a single opaque slide element 15 having a single light permeable linear slit 16 inscribed thereon in the horizontal direction. The focal plane field of the system is represented by the dashed line square 17. The vertical position of slit 16 relative to the focal plane field can be controlled by moving the slide 15 up and down across the field. The horizontal position and length of the line formed by slit 16 can be controlled by means of opaque left and right edge masks 18 and 19.

The lateral position of either mask relative to slide 17 can be controlled until only the desired portion of the slit is exposed. When the slide and the masks are properly positioned, the film is exposed to light through the slit, the period of exposure being determined by conventional shutter mechanisms of the type used in standard cameras.

The length and thickness of the line projected on the film is determined by the enlargement factor to which the projector is set. For example, if a 20" x 20" image on film is desired, a practical enlargement ratio might be 10 to 1, in which case the size of the focal plane field would be 2" x 2".

The slide and masks in the slide assembly may be adjusted by hand or by a servo mechanism 14 having input information fed therein in analog or digital form. In practice, digital servos may be used in which input information is fed in coded form from punched tape. The servo mechanism may be in any known form such as the standard arrangements described in sections 25–5 to 25–8 in the fifth edition of the "Radio Engineering Handbook" of Henney, published by McGraw-Hill in 1959. Such servo systems act in response to positional information, which may be in mechanical or in equivalent electrical form to adjust a remote element to a corresponding position.

In order to have a choice of line thicknesses and dotted and dashed lines, a selector plate 20, as shown in FIG. 3, may be placed behind a slide 21 having a range of line thicknesses, dotted and dashed lines and other linear slit transparencies. The selector plate is provided with a rectangular aperture 22 which may be registered with any selected linear configuration thereby to uncover the selected line and block out the others. An suitable mechanism may be used to position the selector relative to the slide. The positioning system must be aware of which slit on the slide has been selected and must compensate for the fact that the slits are displaced from one another by adding or subtracting the proper difference to the basic coordinate position value of the desired printed line.

The simplified mechanism shown in FIGS. 2 and 3 is designed to produce horizontal lines only. The mechanism can be duplicated in the vertical direction to produce vertical lines, but in this event the arrangement must be such as to avoid obstruction of the vertical slide mechanism and its associated selector by the horizontal elements.

In the composite slide assembly shown in FIG. 4, a reduced number of components serves coordinately to produce both vertical and horizontal lines, the slides acting also as masks to define the length of the lines. Horizontal slits are inscribed centrally on an elongated slide 23 and vertical slits are inscribed centrally on an elongated slide 24 which is reciprocable along an axis perpendicular to that of slide 23. Masks 25 and 26 are provided, mask 25 being reciprocable along the axis of slide 23 and mask 26 along the axis of slide 24. A horizontal line selector 27 acts in conjunction with slide 23 and a vertical line selector 28 acts in conjunction with slide 24.

In the position shown in FIG. 4, the vertical lines of slide 24 are in place in the focal plane field 17 in the projector. The lower opaque margin of slide 23 acts to mask the upper edge of the vertical lines and the upper margin of the relatively short mask 25, the lower edge of the lines thereby determining the projected vertical length. Thus slide 23 serves the dual function of image slide and mask. The vertical line selector (FIG. 5) acts in the usual manner to select a desired line.

For horizontal lines, slide 23 is brought down so that its linear horizontal slits lie in the lens aperture, while slide 24 is now shifted to the left so that its margin masks the left edge of the horizontal lines to the desired degree. To mask the right edge of the horizontal lines, mask 26 is moved inwardly to an extent providing a predetermined line length. Horizontal selector 27 functions in the usual manner. Repetitive exposures are used to establish the desired pattern of horizontal and vertical lines.

FIGS. 6 and 7 show a modification of the assembly illustrated in FIGS. 4 and 5. In the modified form, the vertical line selector 28' is so designed as to eliminate the need for the long opaque section of the slide 24' to the right of the slits thereon. Thus the slits are now adjacent the right end of the slide 24' rather than centered as in slide 24 in FIGS. 4 and 5. It will be seen that selector 28' has an aperture 29 to uncover a selected vertical line on slide 24', the aperture being centrally located.

In practice, the slide 24 (FIG. 4) travels a distance of 4.5" whereas slide 24' (FIG. 6) is required to travel only to 2.5" (a 10:1 reduction from 20' x 20"). The line selector 28' movement is increased from ½ to 2.2". In the position of the line selector 28' shown in FIG. 6, aperture 29 is registered with one of the vertical lines, whereas the mask 26 may be anywhere so long as it does not interfere with the travel of slide 24'.

When drawing horizontal lines, however, the selector 28' is superposed over the slide 24' to block out all lines, and in combination they act as a left edge mask for the horizontal lines on slide 23, the mask 26 serving for the other edge.

Among the advantages of the slide assembly and optical projection disclosed herein is the fact that it may be small and compact as compared to the image it produces and the ruled art work it supplants. The quality of the line is determined by the clarity and accuracy of the slits inscribed on the slides and is always the same rather than subject to servo speed or smoothness, or other problems characteristic of inking, scribing or other optic methods, such as those involving the traversal of a light spot over a light-sensitive surface.

The mechanical motions entailed in the slide assembly are relatively simple and the problem of having one axis motion superimposed on the other when covering an area is eliminated. That is, the mechanism operating in the Y-axis need not ride on a platform moved by the X-axis mechanism.

The selection of line thickness is simple and accurate and the position accuracy of various line thicknesses is dependent only on the accurate spacing of the slits on the slide. All adjustments of scribing and inking tool are obviated. The actual formation of the line image occurs only when all position adjustments are made and locked. No parts are in motion as in the case of scribing, inking or in the scanning of a light beam. Thus jittering and dynamic errors are eliminated. Moreover, there is no residue such as ink bolts or powder from scribing, and no danger of jamming or jabbing into the paper as in inking or scribing. The device in accordance with the invention is fast and economical and makes possible a high level of production with less skilled help.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. An optical line inscribing drafting apparatus comprising a support for a light-sensitive surface, a light source directed toward said surface photographically to effect exposure thereof, and a slide assembly interposed between said source and said surface and including at least one opaque slide having a plurality of light permeable line-forming slits at spaced positions thereon to produce illuminated images of drafting lines, selective means movable relative to said slide and having an aperture therein to expose a selected slit to said light, and masking means movable relative to the selected slit to adjust the length of the line produced thereby.

2. An optical line inscribing drafting apparatus comprising a support for a light-sensitive surface, a light source, a lens system interposed between said source and said surface for projecting an image thereon photographically to effect exposure thereof, and a slide assembly interposed between said lens system and said surface adapted to produce illuminated drafting lines on said surface and including at least one reciprocable slide having a light permeable slit to define an illuminated drafting line on said surface and first and second masks reciprocable relative to the opposing ends of said line to determine the length and longitudinal position thereof.

3. Apparatus, as set forth in claim 2, further including a servo mechanism for controlling the respective positions of said reciprocable slide and masks, and means to feed information into said mechanism to adjust said slide position relative to said surface and to adjust the length of said line in accordance with the information.

4. Apparatus, as set forth in claim 3, wherein said information is in digital coded form and is derived from a punched tape.

5. Apparatus, as set forth in claim 3, wherein said information is in analog form.

6. An optical line inscribing drafting apparatus comprising a support for a light-sensitive surface, a light source, a lens system interposed between said source and said surface for projecting an image thereon, and a slide assembly selectively adapted to produce illuminated vertical and horizontal lines on said surface, said slide assembly including an opaque slide reciprocal in a vertical coordinate and having a light permeable horizontal slit inscribed thereon, a second opaque slide reciprocal in the horizontal coordinate and having a light permeable vertical slit inscribed thereon, a first mask reciprocable along said vertical coordinate and a second mask reciprocable along said horizontal coordinate, said masks being adjustable relative to the associated slide to determine the extent of slit exposure.

7. An optical line inscribing drafting apparatus comprising a support for a light-sensitive surface, a light source, a lens system interposed between said source and said surface for projecting an image thereon, and a slide assembly selectively adapted to produce illuminated vertical and horizontal lines on said surface, said slide assembly including an elongated opaque slide reciprocable in a vertical coordinate and having light permeable horizontal slits inscribed centrally thereon, a second opaque slide movable along the horizontal coordinate and having light permeable vertical slits inscribed centrally thereon, a first mask reciprocable along said vertical coordinate and a second mask reciprocable along said horizontal coordinate, said masks being adjustable relative to the associated slide to determine the extent of slit exposure, and first and second selector plates movable relative to said first and second slides, each plate having an aperture thereon whereby a given slit on the associated slide may be selectively exposed.

8. An optical line inscribing drafting apparatus comprising a support for a light-sensitive surface, a light source directed toward said surface photographically to effect exposure thereof, and a slide assembly interposed between said source and said surface, said assembly including slide means having light permeable horizontal and vertical drafting line-forming slits inscribed thereon to produce illuminated images of drafting lines, opaque selector means provided with an aperture and adjustable relative to said slide means to select given horizontal and vertical slits on said slide means for presentation on said surface and to block out the remaining slits, and masking means movable relative to said slits to adjust the length of said lines.

References Cited in the file of this patent

UNITED STATES PATENTS

| | | |
|---|---|---|
| 1,553,920 | Smothers | Sept. 15, 1925 |
| 1,600,535 | Citron | Sept. 21, 1926 |
| 1,906,973 | Kingsbury | May 2, 1933 |
| 2,357,593 | Leavell | Sept. 5, 1944 |
| 2,744,443 | Higonnet et al. | May 8, 1956 |
| 2,883,918 | Mosteller | Apr. 28, 1959 |

OTHER REFERENCES

Sample Chart of Bourges-Hutchison Shading Sheets, patterns of 1926.